United States Patent [19]

Madhavan

[11] Patent Number: 5,784,273
[45] Date of Patent: Jul. 21, 1998

[54] METHOD AND SYSTEM FOR PREDICTING LIMIT CYCLE OSCILLATIONS AND CONTROL METHOD AND SYSTEM UTILIZING SAME

[76] Inventor: Poovanpilli G. Madhavan, 3347 Landings Dr., Ann Arbor, Mich. 48103

[21] Appl. No.: 745,014

[22] Filed: Nov. 7, 1996

[51] Int. Cl.$^6$ .................................................. G05B 13/02
[52] U.S. Cl. .................. 364/176; 364/152; 364/474.17; 364/148.09; 702/56
[58] Field of Search .................................. 364/176, 177, 364/148, 152, 155, 157, 474.17, 474.16, 474.15, 507, 508, 974.19, 551.02, 551.01, 148.09; 340/680, 683; 73/104, 105; 702/42, 56, 1

[56] References Cited

U.S. PATENT DOCUMENTS

| | | | |
|---|---|---|---|
| 3,634,664 | 1/1972 | Valek | 364/153 X |
| 4,559,600 | 12/1985 | Rao | 364/508 X |
| 4,604,834 | 8/1986 | Thompson | 364/474.06 X |
| 4,636,779 | 1/1987 | Thomas et al. | 340/680 |
| 4,642,617 | 2/1987 | Thomas et al. | 340/680 |
| 4,744,242 | 5/1988 | Anderson et al. | 340/683 X |
| 4,759,243 | 7/1988 | Thompson | 82/1 C |
| 4,849,741 | 7/1989 | Thomas | 340/683 |
| 4,918,427 | 4/1990 | Thomas et al. | 340/683 |
| 4,926,309 | 5/1990 | Wu et al. | 364/149 |
| 4,980,844 | 12/1990 | Demjanenko et al. | 364/550 |
| 5,115,671 | 5/1992 | Hicho | 73/660 |
| 5,170,358 | 12/1992 | Delio | 364/474.19 |
| 5,197,018 | 3/1993 | Oh | 364/474.17 X |
| 5,407,265 | 4/1995 | Hamidieh et al. | 364/474.17 X |

OTHER PUBLICATIONS

"Signature Analysis Methods and Applications for Rotating Machines", S.G. Braun & B. Seth, American Society of Mechanical Engineers, Aug. 1978, pp. 1–8.

"On the Extraction and Filtering of Signals Acquired from Rotating Machines", S.G. Braun & B.B. Seth, Journal of Sound & Vibration (1979) 65(1), pp. 37–50.

"Stability of Nonlinear Systems", Prof. Derek P. Atherton, Research Studies Press, 1981, pp. 28–29.

"Signature Analysis Applied to Drilling", S. Braun, E. Lenz & C.L. Wu, Design Engineer Technical Conference, Sep. 20–23–1981, pp. 2–9.

"An On–Line Method of Determining Tool Wear by Time–Domain Analysis", SME Technical Paper MR82–901, 1982, pp. 1–6.

"In–Process Detection of Tool Breakage by Monitoring the Spindle Motor Current of a Machine Tool", K. Matsushima, P. Bertok & T. Sata, ASME Winter–Annual Meeting 1982.

"On the Use of Drill–Up for on–Line Determination of Drill Wear", SMES, Techical Paper MS84–914, 1984, pp. 1–12.

"Computer–Assisted Prediction of Drill Failure Using In–Process Measurement of Thrust Force", A. Thangaraj & P.K. Wright, ASME Winter Annual Meeting–1986, pp. 303–322.

"Machining Chatter Suppression by Means of Spindle Speed Variation", Halyan Zhang, Jun Ni & Hanmin Shi, S.M. Wu Symposium, vol.1, 1994, pp. 161–175.

(List continued on next page.)

*Primary Examiner*—Joseph Ruggiero
*Attorney, Agent, or Firm*—Brooks & Kushman P.C.

[57] ABSTRACT

A data-driven method and system are provided for predicting limit cycle oscillations such as chatter to obtain a classifier signal which, in turn, may be utilized by a control method and system. The method and system utilize algorithms based on random field theory which are applied to "vibration" data to predict when chatter phenomenon may emerge during an ongoing machining process. Using real data from a turning operation on a lathe, the onset of chatter can be predicted so that sufficient time is available to deploy an automatic control strategy such as reduction or random variation of spindle speed to quench the "chatter". The method and system preferably use instantaneous scale of fluctuation.

26 Claims, 10 Drawing Sheets

OTHER PUBLICATIONS

"Linear Discriminant Function Analysis of Acoustic Emission Signals for Cutting Tool Monitoring", E.Kannatey-Asibu & E.Emel, Mechanical Signal Processing, 1987 I4, 333-347.

"Mechanical Signature Analysis in Interupted Cutting", J. Rotberg, E. Lenz, S. Braun, Annals of the CIRP, vol. 36/1/1987, pp. 249-252.

"Milling Cutter Breakage Sensing", CIRP Annals, 37/1/1988, pp. 45-51.

"Tool Break Detection by Montoring Ultrasonic Vibrations", S.R. Hayashi, C.E. Thomas, D.G. Wildes, GE Corporate Research & Development, Jan. 18, 1988.

"In-Process Detection of Tool Failure in Milling Using Cutting Force Models", Y. Altinas & I. Yellowley, Journal of Engineering for Industry, May 1989, vol. 111/149.

"On-Line Monitoring of Tool and Cutting Conditions in Milling", J.H. Tarn & M. Tomizuka, Transactions of the ASME, vol. 111, Aug. 1990, pp. 206-212.

"Improved Methods for the Prediction of Chatter in Turning, Part 1: Determination of Structural Response Parameters", Minis, I.E., Nagrab, E.B. & Pandelidis, I.O. Transactions of the ASME, vol. 112, Feb. 1990, pp. 12-35.

"Vibration-Based Drill Wear Monitoring", J. Rotberg, E. Lenz & S. Braun, AMME, 1990, pp. 60-65.

"Recognition of Chatter with Neutral Networks", J.N. Tansel, A. Wagiman & A. Tziranis, Int.J. Mach. Tools Manufact. vol. 31, No.4, pp. 539-552, 1991.

"Nonlinear Dynamics and Chaos", Steven H. Strogatz, Addison-Wesley Publishing Co. pp. 196-197.; Feb. 1994.

"On-Line Cutting State Recognition in Turning Using a Neural Network", M. Rahman, Q. Zhou, G.S. Hong, Int. J. Adv. Manuf. Technol. (1995) 10:87-92.

ATAM System Brochure, IRD Mechanalysis, Form 2290B, 1990.

"Random Fields: Analysis and Synthesis", Erik Vanmarcke, Chapter 5, , pp. 185-233, 1988.

"Kalman Filtering and Time-Frequency Distribution of Random Signals", P.G. Madhaven & W.J. Williams, Society of Photo-Optical Instrumentation Engineers Conf. 1996.

METHOD AND SYSTEM FOR PREDICTING LIMIT CYCLE OSCILLATIONS AND CONTROL METHOD AND SYSTEM UTILIZING SAME

TECHNICAL FIELD

This invention relates to methods and systems for predicting limit cycle oscillations and control methods and systems utilizing such predictions.

BACKGROUND ART

Limit cycle oscillations arise in many natural systems such as machine tool, brain electrical signals, return on stock, electrocardiogram, earthquake, vibrations of mechanical structures (such as bridges,. airplane wings, automobile engines and suspensions among others) and communication networks, for example Chatter, a type of limit cycle oscillation, is a self-excited relative vibration between the workpiece and the cutting tool in common machining processes such as turning process on a lathe as described in Zhang, H., Ni, J. and Shi, H., "Machining Chatter Suppression by Means of Spindle Speed Variation", PROC. S. M. Wu Symposium, Vol. 1, pp. 161-175, 1994.

The development of chatter causes a machining process to become unstable. This can result in poor surface finish, accuracy and reduced tool and other machine part life. Having to control machine tool chatter after it arises by traditional means such as by reducing spindle speed restricts the amount of material that can be removed in a turning process, for example. Therefore, development of chatter in a machining process reduces productivity and quality.

The three major approaches to chatter prediction are described in Minis, I. E., Magrab, E. B. and Pandelidis, I. O., "Improved Methods for the Prediction of Chatter in Turning, Part 3: A Generalized Linear Theory", ASME *Journal of Engineering for Industry*, vol. 112, pp. 28–35, 1990; Tansel, I. N. et. al, "Recognition of Chatter With Normal Networks," *Int. J. Mach. Tools. Manufact.*, vol. 31, No. 4, pp. 539–552, 1991; and the U.S. patent to Delio entitled "Method of Controlling Chatter in a Machine Tool," U.S. Pat. No. 5,170,358.

The presence and evolution of chatter can be monitored by measuring the vibration signals from the cutting tool using appropriately placed accelerometers. Such a signal is called the "chatter signal." The chatter signal can be analyzed to discern the state of the machining process. A conceptual model of the chatter signal generation is shown in FIG. 1. As is clear, the chatter signal, X(t), will be a complicated random signal.

The three approaches to manufacturing operations of relevance to chatter phenomenon can be categorized as (1) Prevent Approach (leads to conservative operational ratings and resultant low throughput); (2) Detect and Control Approach (leads to reworking or scrapping workpieces and resultant low quality and throughput); and (3) Predict and Prevent Approach (leads to optimal high operational ratings and resultant high quality and high throughput).

SUMMARY OF THE INVENTION

An object of the present invention is to provide a method and system for predicting limit cycle oscillations in a data-driven fashion.

Another object of the present invention is to provide a method and system for predicting limit cycle oscillations in a data-driven fashion to obtain a classifier signal which, in turn, is utilized in a control method and system of the present invention.

Another object of the present invention is to provide a method and system for predicting limit cycle oscillations such as chatter wherein algorithms based on random field theory are applied to "vibration" data to predict when the chatter phenomenon may emerge during an ongoing machining operation.

Still another object of the present invention is to provide a method and system for predicting limit cycle oscillations such as chatter wherein algorithms based on random field theory are applied to "vibration" data to predict when the chatter phenomenon may emerge during an ongoing machining operation so far in advance that there is ample time to use such a prediction. Control strategies such as reduction or random variation of spindle speed to "quench" the chatter may then be employed in a control method and system of the present invention.

Yet still another object of the present invention is to provide a method and system for predicting limit cycle oscillations in a machining operation to increase throughput and quality of machined workpieces.

In carrying out the above objects and other objects of the present invention, a method is provided for predicting limit cycle oscillations. The method includes the steps of generating a signal based on oscillatory behavior, statistically processing the signal to obtain a corresponding envelope signal and monitoring instantaneous changes in a function which is based on the envelope signal. The method also includes the step of generating a classifier signal when the instantaneous changes are less than a predetermined threshold value for a predetermined time period whereby the classifier signal is a prediction of the limit cycle oscillations.

Still further in carrying out the above objects and other objects of the present invention, a control method is also provided utilizing all of the above-noted steps and further including the step of generating an output control signal based on the classifier signal.

In one embodiment, the function is an instantaneous scale of fluctuation which tracks changes in a scale of fluctuation over time. The instantaneous scale of fluctuation is a function of an estimate of the energy distribution of the envelope signal and an inverse Fourier transform of the energy distribution of the envelope signal.

In another embodiment, the instantaneous scale of fluctuation is estimated also based on the energy distribution of the envelope signal and an estimate of the variance of the envelope signal.

In yet still another embodiment, a simple approximation of the method of monitoring the instantaneous scale of fluctuation is provided by monitoring an instantaneous autocorrelation function or its approximate estimates and its first zero-crossing lag.

Still further in carrying out the above objects and other objects of the present invention, systems are provided for carrying out the above-noted method steps.

The ability to predict chatter allows for simultaneously maximizing production throughput, surface finish of the workpiece and machine tool life in the industrial practice of machining process. The method and system of the present invention (also referred to as Limit Cycle Prediction Using Scale of Fluctuation (LP-SOF)) permits the prediction of chatter development over 300 milliseconds in advance, thereby providing an opportunity within the machining process to avoid chatter and the concomitant reduction of productivity and quality. Therefore, the invention described herein should find practical application in any machining process where chatter phenomenon can compromise quality and productivity.

Chatter prediction using the method and system of the present invention relies on a purely data-driven approach and does not require the knowledge of various system model parameters a-priori. Newly-developed algorithms based on random field theory are applied to "vibration" data to predict when the chatter phenomenon may emerge during an on-going machining process.

The method and system of the present invention makes the Predict & Prevent approach of FIG. 2 possible in the manufacture of high value-added components. FIG. 3 illustrates the content of the module of FIG. 2.

Using real data collected during machining operations, it has been shown that the onset of chatter can be predicted as much as 300 milliseconds in advance. This is ample time to deploy simple automatic control strategies such as reduction or random variation of the spindle speed to prevent the chatter (rather than "quench" chatter after it has fully developed, which can be much more difficult). The spindle speed control output signal, sc(n), of FIGS. 2 and 3 provide such control.

Some of the commercial features of the method and system of the present invention are as follows:

After some initial developmental work, the method and/or system of the present invention can be part of any new CNC machines or "retrofitted" on many existing machines.

The potential for such a method and system in a high speed, high quality production system is obvious (i.e., increased throughput and quality). The financial impact of such an advance in the manufacture of high-value-added components such as pistons, computer disk drive parts, etc., can be significant.

The ability to predict chatter permits a certain extra "margin of safety" in the design and manufacturing stages (for example, the quality of raw material for manufacturing can be more viable) of machine tools.

For the same level of design and manufacturing quality, the machine tool can be operated above its usual conservative rating.

The method and system of the present invention provides machine tool chatter prediction in CNC machining systems utilizing newly developed methods in random field theory and Kalman-time frequency distributions. The machine tool chatter prediction is preferably accomplished by the specific method called LP-SOF. The ability to predict chatter allows for simultaneously maximizing production throughput, surface finish of the workpiece and machine tool life in the industrial practice of machining process.

The LP-SOF method uses the statistical signal processing methods of random field theory of local averages and Kalman time frequency distribution instead of the traditional methods of chatter prediction as described in Tansel, I. N. et. al, "Recognition of Chatter With Normal Networks," Int. J. Mach. Tools Manufact., Vol. 31, No. 4, pp. 539–552, 1991, to extract information from y(n), which is sampled version of X(t). The LP-SOF method can predict oncoming chatter over 300 milliseconds in advance.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
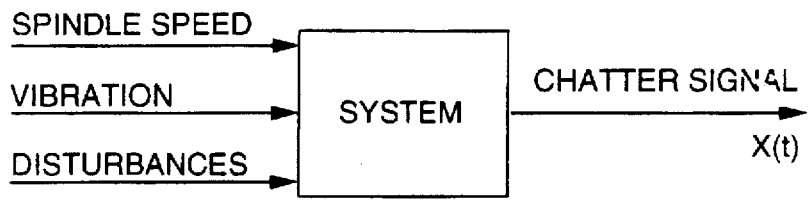
FIG. 1 is a single block illustrating chatter signal generation of the prior art.
Figure 2:
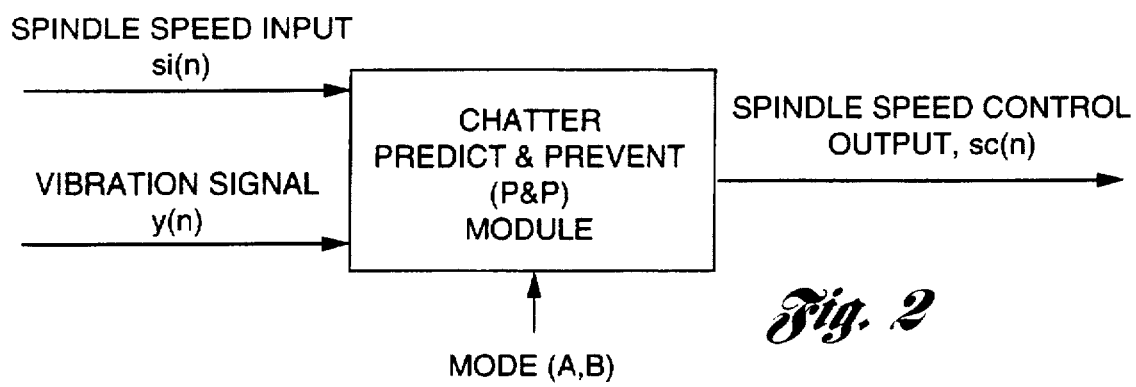
FIG. 2 is a single block illustrating output control signal generation of the method and system of the present invention wherein Mode A is the chatter-free operation for a given feed rate and spindle speed and Mode B is for maximum spindle speed with chatter-free operation for a given feed rate.
Figure 3:
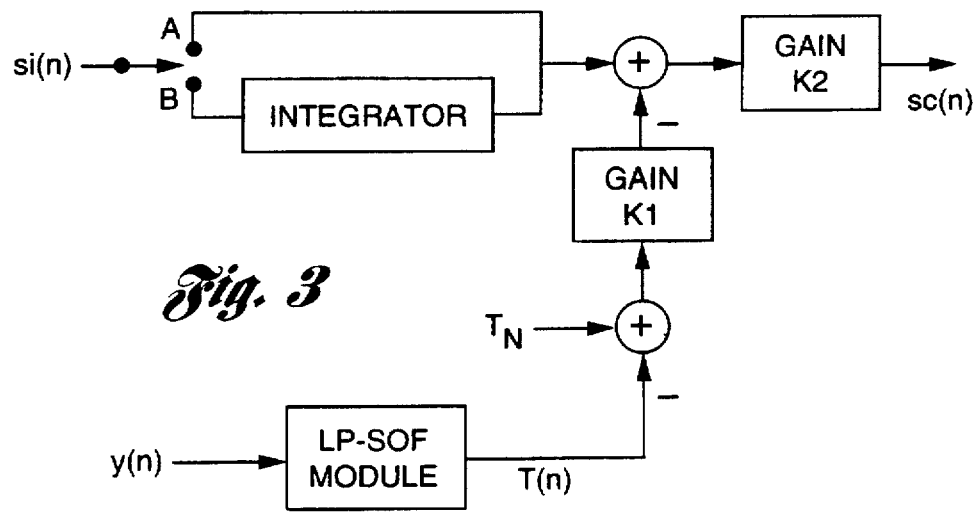
FIG. 3 is a schematic block diagram of the contents of Chatter P&P module of FIG. 2 wherein switch settings provide the Mode A or B operation.
Figure 4:
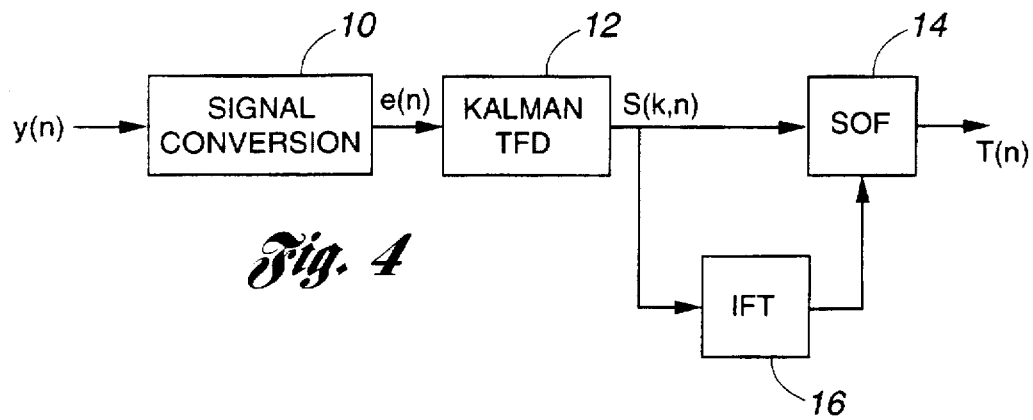
FIG. 4 is a schematic block diagram of the contents of the LP-SOF module or block of FIG. 3.

The method and system of the present invention can be best explained by defining precisely the functions of each of the blocks in FIG. 4 and specifying the proper choice of parameters therein. FIG. 4 is a detailed block diagram of the components of the LP-SOF module of FIG. 3.

Signal Conversion

A sampled chatter signal, y(n), is converted to its "envelope signal", e(n) at block 10. The y(n) signal's analytic signal counterpart is obtained by Gabor's construction and the magnitude of the analytic signal is the envelope, e(n).

Analytic signal, $a(n)=y(n)+j\ HT[y(n)]$, where "j" is the $\sqrt{(-1)}$ and HT[] is the Hilbert transform operation. Then, the envelope, $e(n)=|a(n)|$ where $|\ |$ is the magnitude of the complex number, a(n). The envelope, e(n) is real and low pass.

Kalman-TFD

As described in Madhavan. P. G. and Williams, W. J., "A Time Varying Model for the Estimation of Time-Frequency Distribution of Signals in the Presence of Noise", *IEEE Signal Processing Letters*, 1996 (submitted), a time-varying, stochastic, state space model of e(n) is used to estimate the energy distribution of e(n) in the time-frequency plane at block 12:

$$\underline{X}(n+1) = \underline{A_0}\underline{X}(n) + \underline{w}(n) \quad \underline{\phi}_c = \frac{1}{M}\left[1 \ldots e^{-j\frac{2\pi}{M}nk} \ldots e^{-j\frac{2\pi}{M}n(M-1)}\right]^T$$

It has been shown that $X_k(n)$ can be estimated in the presence of noise using the Kalman filter algorithm and that S(k,n) is a good estimate of the instantaneous TFD. In the present example, M=10.

Scale of Fluctuation (i.e., block 14)

As described in Vanmarcke, E., "Random Fields: Analysis and Synthesis", *MIT Press*, Cambridge, Mass. 1988, scale of fluctuation, θ, captures some important statistical properties of time series such as "characteristic or correlation length." The scale of fluctuation, θ, is defined mathematically as follows:

$$\theta = \pi \frac{G(0)}{B(0)}$$

where G(0) is the zero-frequency value of the one-sided power spectral density of e(n) and B(0) is the zero-lag value of the autocorrelation function of e(n).

A new measure of the present invention called the "instantaneous scale of fluctuation" "tracks" the changes of θ over time. Based on the Kalman-TFD, a new estimate of the instantaneous scale of fluctuation is defined as follows:

$$T(n) = \frac{S(o,n)}{r(0,n)}$$

where S(0,n) is the zero-frequency slice of the Kalman-TFD and r(0,n) is the zero-lag slice of instantaneous autocorrelation function, r(m,n)=IFT[S(k,n)] where IFT[] is the inverse Fourier transform (i.e., block 16).

Threshold Detection

Referring again to FIG. 3, the estimated instantaneous scale of fluctuation, T(n), is continuously monitored. If T(n) is less than 5 for more than 10 milliseconds, fully developed chatter is predicted in 100 milliseconds or later. This means that the CNC machine control system will have 100 milliseconds or more to institute chatter control measures.

Working Models

Figure 7:
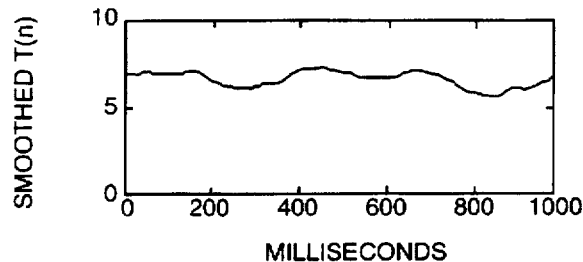
FIG. 7 are graphs of test data during normal operation (i.e. no chatter condition)
Figure 8:
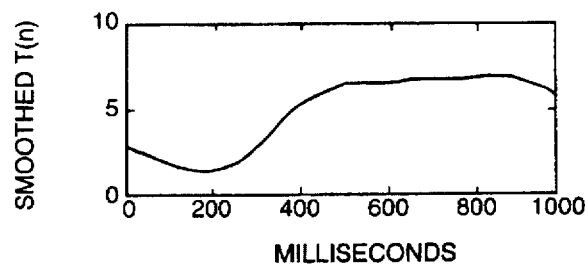
FIG. 8 are graphs (similar to the graphs of FIG. 7 but with a different chatter signal amplitude scale) during various chatter conditions: (1) pre-chatter from 0 to 250 msec; (2) chatter onset from 250 to 450 msec; and (3) fully developed chatter from 450 msec to 1 sec.

The LP-SOF method was tested with real data from turning process on a lathe during normal operation and chatter development. Results are shown in FIGS. 7 and 8. Both Figures show the chatter signal, y(n) on the top panel and the smoothed estimate of instantaneous scale of fluctuation, T(n), in the bottom panel.

The following features are important to note in FIGS. 7 and 8:

a) The amplitude scales for chatter signal are different; the amplitude of x(n) in FIG. 7 during normal operation is of the same order as the amplitude of pre-chatter signal in the interval from 0 to 250 msec in FIG. 8.

b) In FIG. 7, the value of T(n) stays relatively stable around 7. In FIG. 8, when chatter is fully developed after 450 msec, T(n) value is again approximately around 7. Thus T(n) is relatively insensitive to operating conditions during normal operation and fully developed chatter.

c) In FIG. 8, the value of T(n) is significantly and consistently below 5 during pre-chatter condition. It can be concluded that the value of T(n) staying below 5 is a predictor of chatter that develops fully after approximately 400 msec.

Therefore, this working model demonstrates that if the chatter signal is processed as defined in FIG. 4, the value of T(n) can be monitored to observe if it falls below 5. If T(n) stays below 5 for over 10 milliseconds, predict fully developed chatter to emerge in over 100 milliseconds.

Figure 5:
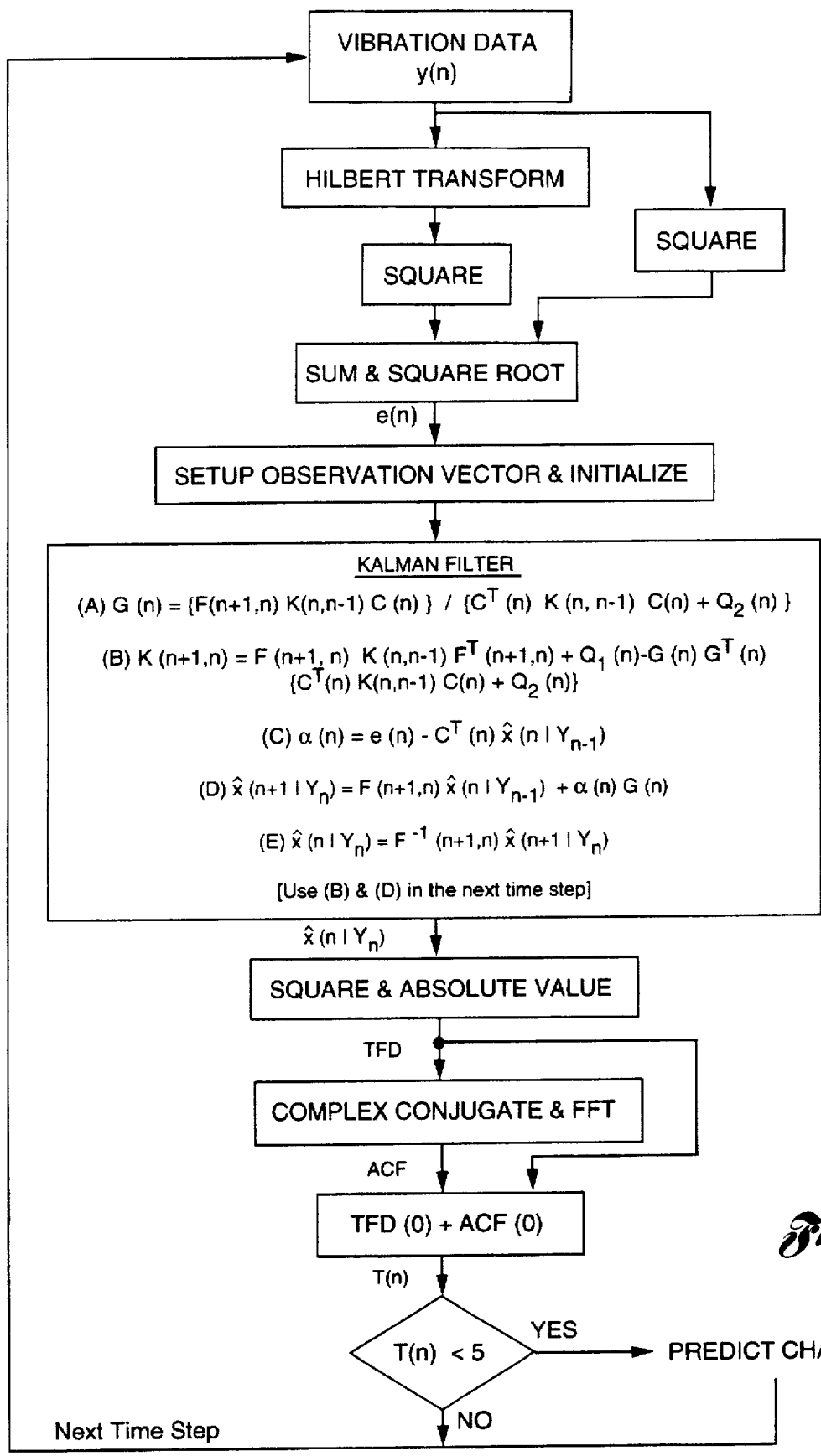
FIG. 5 is a block diagram flow chart illustrating a software implementation of the method and system of the present invention.

FIG. 5 is a block diagram flow chart of the steps performed by a properly programmed microcomputer or controller to implement the method and system of the present invention. The steps correspond to the blocks of FIG. 4 and the corresponding description thereof as noted above.

Figure 6:
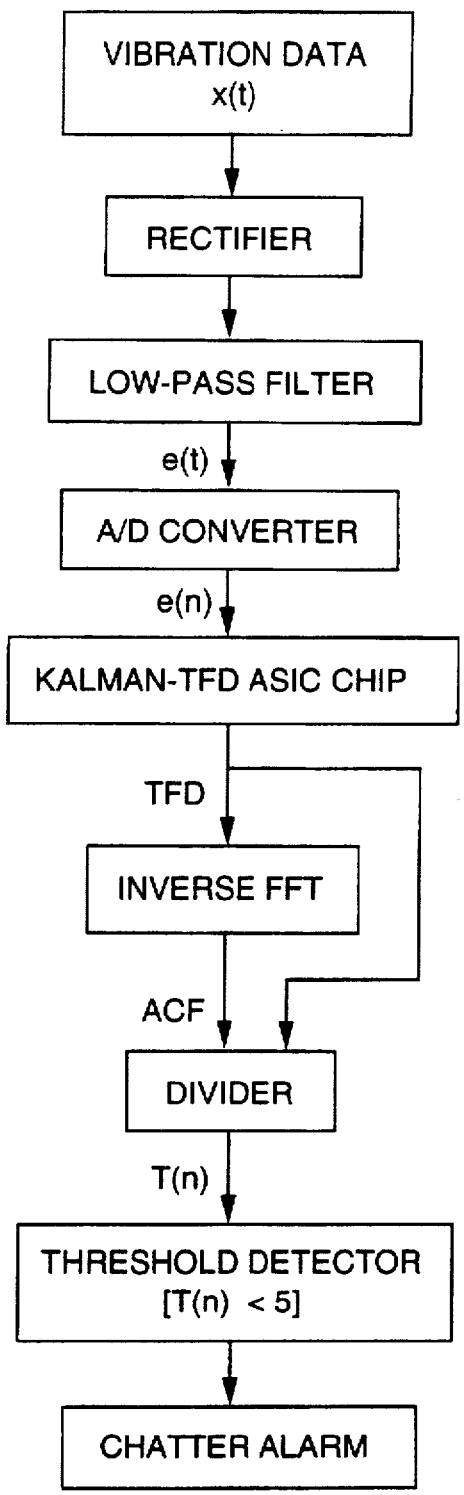
FIG. 6 is a block diagram flow chart illustrating a hardware implementation of the method and system of the present invention.

FIG. 6 is a schematic block diagram of a hardware implementation of the method and system of the present invention. The blocks of FIG. 6 also correspond to the blocks of FIG. 4 and the corresponding description thereof as noted above.

Alternative Embodiments

An alternate method of estimating the instantaneous scale of fluctuation, T(n), is as follows:

$$T_N(n) = \frac{S(0,n)}{\sum_{k=1}^{M} S(k,n)}$$

where S(0,n) is the zero-frequency slice of the Kalman-TFD and the denominator is an estimate of the variance of the signal. Even though $T_N(n)$ does not have the usual meaning of scale of fluctuation, $T_N(n)$ will be normalized such that it always lies between 0 and 1. This may be advantageous in certain applications where threshold monitoring is utilized.

As a crude and simple approximation of the LP-SOF method of monitoring the instantaneous scale of fluctuation, the instantaneous autocorrelation function, r(0,n), (or its approximate estimates such as short-time windowed autocorrelation function) can be utilized. The first zero-crossing lag, $\tau_0$, of the instantaneous autocorrelation function, r(0,n), can be monitored and significant reduction of its value can potentially be used as a means of predicting the onset of limit cycle oscillations.

Ramifications

The LP-SOF method can be used to predict the appearance or disappearance of limit cycle oscillations in many natural systems as noted in the Background Art of the present application.

Scale of Fluctuation—An Invariant Property of a Class of Random Processes

Vanmarcke developed a new theory of random fields based on the concept of local averaging and the characterization of the second-order properties of the random fields using the variance function. Certain asymptotic properties of the variance function lead to the definition of a scalar called the "scale of fluctuation, θ", which has many interesting properties. A newly-discovered property is the invariance of θ for certain class of random processes. This feature is investigated for second-order auto-regressive random processes and it is shown that constant-θ contours for AR(2) processes are approximately circles with centers on the non-negative real axis with radius less than or equal to half. A non-parametric method of estimating time-varying θ is developed using the time-varying model-based time-frequency distribution. Simulated machine tool chatter data show that θ captures a very important invariant property related to the unit-standard deviation contour volume of the joint probability density function of the chatter process. Tests with real vibration data from machine tools before and during chatter show that estimated θ may permit on-line prediction of chatter development many hundreds of milliseconds in advance.

I. Introduction

Vanmarcke [11] introduced a comprehensive theory of random fields which extends very elegantly to multi-dimensional cases. His "random field theory of local averages" captures the effect that local averaging has on a homogeneous random field. The quantification of the effects of local averaging leads to a function which characterizes the second-order properties of the random field called the "variance function." A scalar called the "scale of fluctuation" derived from the variance function has many nice interpretations, some historic and some new. The scale of fluctuation can be considered to be similar to other scalars derived from multidimensional probability density functions such as correlation or Shannon entropy. The information that the scale of fluctuation provides is different from correlation or entropy; in the case of a time series, the scale of fluctuation is a measure of the "time scale" of a random process over which the correlation structure of that random process is characterized [9, 11].

After reviewing the basic concepts of random field theory and scale of fluctuation, this paper introduces a new invariance property of scale of fluctuation. It is shown that in the case of Gaussian random process, this invariance property captures the "volume" of the joint probability density function which may have significant practical applications. A simulated data example is discussed later to develop the ideas behind the invariance property. An important notion of time-varying scale of fluctuation is introduced and a new estimation method using Kalman filtering is developed. The paper concludes with preliminary results from a practical application of time-varying scale of fluctuation for the prediction of machine-tool chatter. Tests with simulated machine-tool chatter data provide the possible rationale for the use of time-varying scale of fluctuation for the prediction of machine-tool chatter.

H. Theory Review

Consider a zero-mean, stationary, real random process, x(t) with a variance of $\sigma^2$ and the following definitions of its second-order properties:

1) Correlation Function:

$$B(\tau) = E[X(t)X(t+\tau)]$$

2) Normalized Correlation Function:

$$\rho(\tau) = \frac{B(\tau)}{\sigma^2}$$

3) Spectral Density Function (s.d.f.):

$$S(\omega) = \frac{1}{2\pi} \int_{-\infty}^{\infty} B(\tau) e^{-j\omega\tau} d\tau$$

4) One-sided s.d.f.:

$$G(\omega) = 2S(\omega); \omega \geq 0$$

5) Normalized s.d.f. (unit area):

$$g(\omega) = \frac{1}{\sigma^2} G(\omega)$$

The concept of variance function is developed by considering the following moving average process, $X_T(t)$:

$$X_T(t) = \frac{1}{T} \int_{t-\frac{T}{2}}^{t+\frac{T}{2}} X(u) du$$

For larger averaging window, T, the variance, $\sigma_T^2$, of the corresponding moving average process will be smaller than $\sigma^2$. The variance function is defined as follows:

$$\gamma(T) = \sigma_T^2/\sigma^2$$

Vanmarcke showed that as T increases, γ(T), has a characteristic shape and that the limiting value of Tγ(T) is very meaningful. In fact, the limit is called the "scale of fluctuation, θ" and the limit exists [11] if the slope of the normalized spectral density function at ω=0 is zero.

$$\begin{aligned}
\theta &= \lim_{T \to \infty} T\gamma(T) \\
&= \int_{-\infty}^{\infty} \rho(\tau) d\tau = \pi g(0)
\end{aligned} \quad (1)$$

From equation (1), θ is the "area" under the normalized correlation function or proportional to the zero-frequency ordinate of the normalized spectral density function. Many interpretations for θ exists and is variously known as "characteristic length", "correlation length" or "duration of persistence of trends." For a real-valued autoregressive random process, X(t), or order P, using results developed by Vanmarcke [11], the scale of fluctuation, $\theta_x$, can be obtained as follows:

$$\begin{aligned}
\theta_x &= \theta_w \frac{\sigma_w^2}{\sigma_x^2} |H(0)|^2 \\
&= \frac{|H(0)|^2}{\sigma_x^2} \text{ where } |H(0)|^2 = \left[\frac{1}{1 + \sum_{i=1}^{P} a_i}\right]^2
\end{aligned} \quad (2)$$

Here, H(ω) is the transfer function of the linear-time invariant system relating white noise process to the AR(P) process. $\theta_x$ is the scale of fluctuation of the white noise process ($\theta_x=1$), $\sigma_w^2$ is the variance of the white noise process ($\sigma_w^2=1$), $\sigma_x^2$ is the variance of the AR(P) process and $\{a_i\}$, i=1 to P are the AR coefficients.

Figure 9:
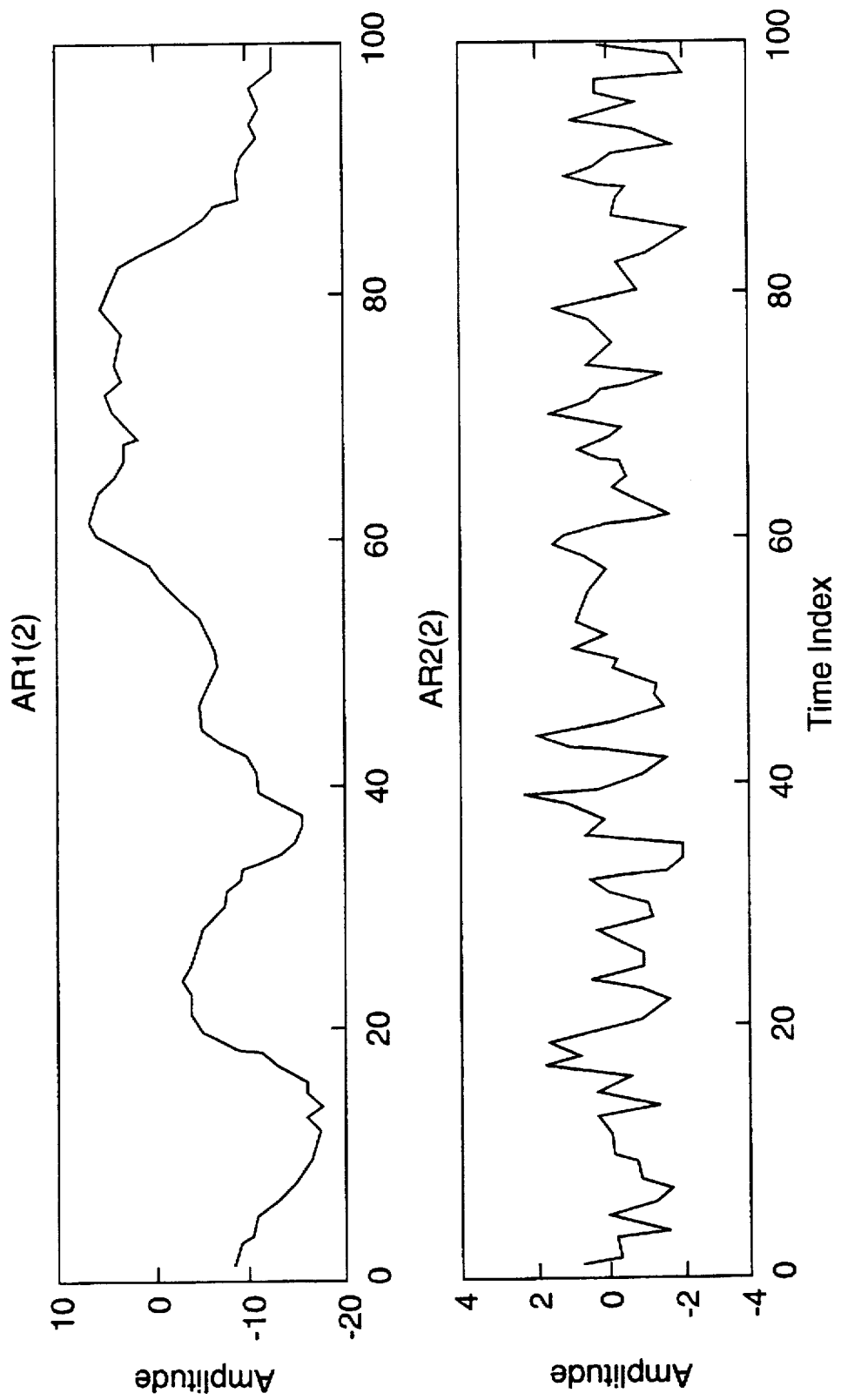
FIG. 9 are graphs which illustrate typical realizations of time series, $AR_1(2)$ with $\theta=17.9$ and $AR_2$ (2) with $\theta=2$.

To develop a better understanding of θ consider two discrete-time AR(2) processes with model equations as follows—(1) $AR_1(2)$: $x_1(n)=1.8x_1(n-1)-0.82\ x_1(n-2)+w_1(n)$ and (2) $AR_2(2)$: $x_2(n)=0.6x_2(n-1)-0.2x_2(n-2)+w_2(n)$. Typical 100-point data sequences are shown in FIG. 9. Using equation (2), the scale of fluctuation can be calculated knowing that [4].

$$\sigma_x^2 = \frac{1+a_2}{1-a_2} \frac{1}{(1+a_2)^2 - a_1^2} \quad (3)$$

where $a_1$, $a_2$ are the AR coefficients {−1.8, 0.82} and {−0.6, 0.2}. For $AR_1(2)$, $\theta_1=17.9$ and for $AR_2(2)$, $\theta_2=2$. The interpretations of θ as "correlation length" or "duration of persistence of trends" are clear by considering the plots in FIG. 9. The $AR_1(2)$ data is seen to be a narrowband signal with correlation function that will persist for a long time ($\theta_1 = 17.9$) whereas the $AR_2$ (2) data has a correlation function that dies out rapidly ($\theta_2 = 2$).

III. Invariance Property

For a real-valued AR(2) process, consider the expression for θ. If the pole positions corresponding to real coefficient $\{a_1, a_2\}$ are $(x \pm jy)$, the expression for θ can be written as follows:

$$\theta = \frac{(1-x^2-y^2)[(1+x^2+y^2)^2 - 4x^2]}{(1+x^2+y^2)[(1-2x+x^2+y^2)^2]} \quad (4)$$

Figure 10B:
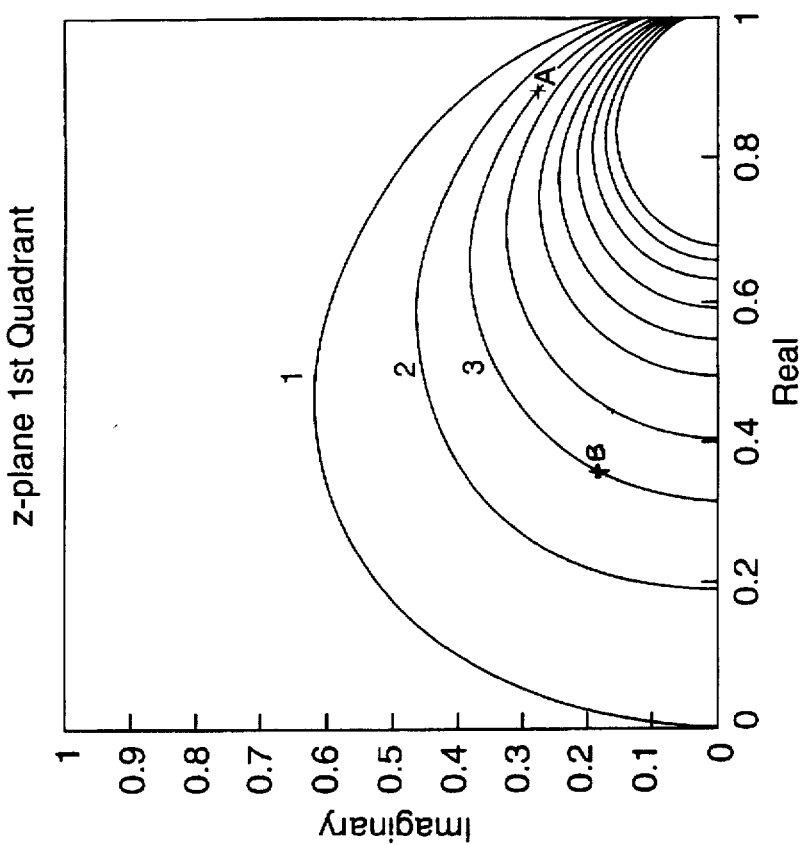
FIG. 10b is a graph with constant $\theta$ contours; the two AR(2) random processes, A and B, are marked on the $\theta=3$ contour.
Figure 10A:
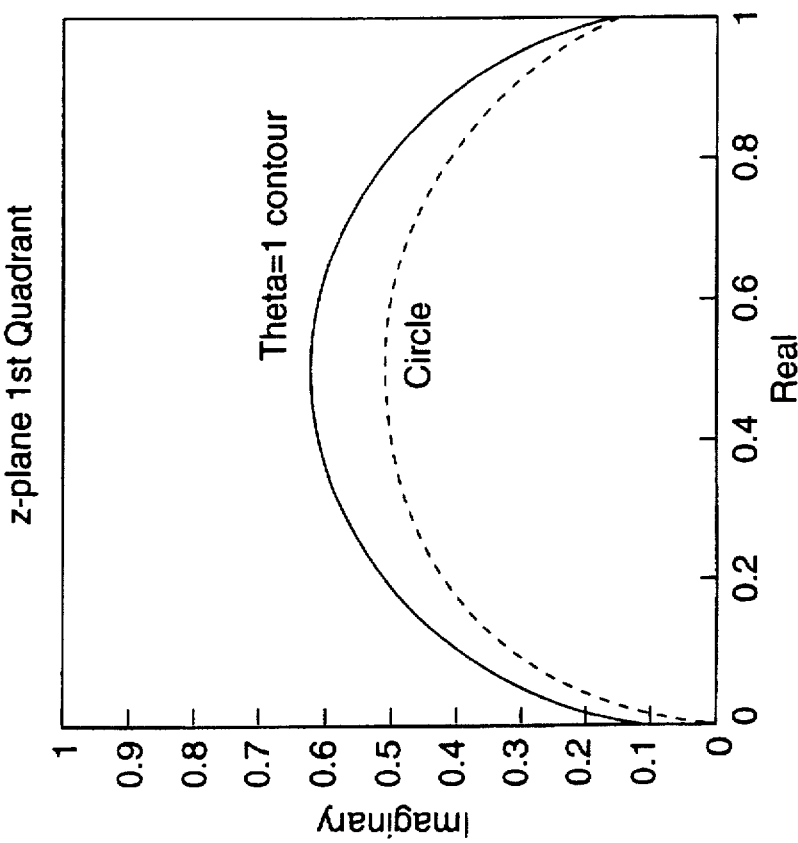
FIG. 10a is a graph with a $\theta=1$ contour in a solid line and a circle, $X^2+y^2$ in a dotted line.
Figure 11:
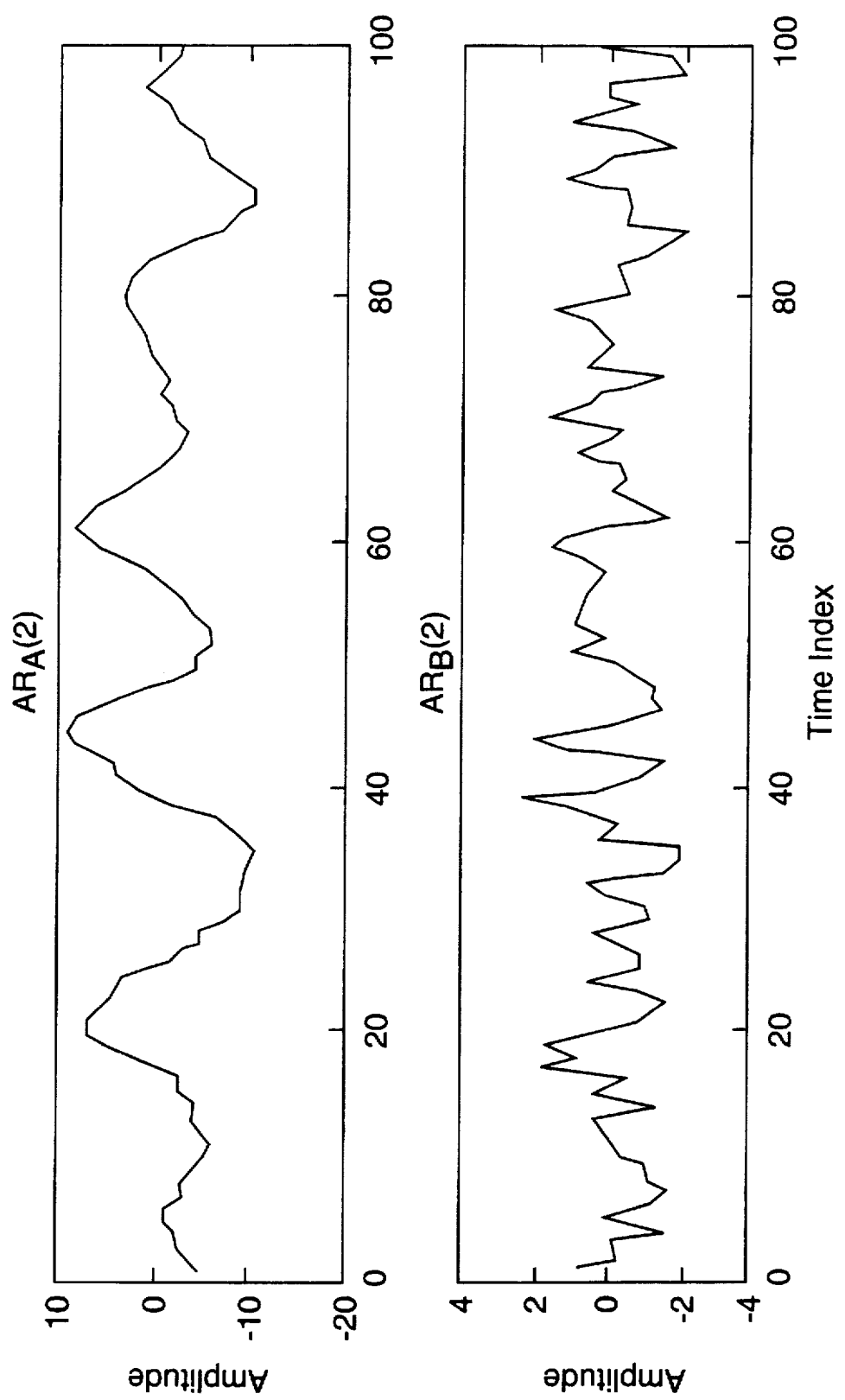
FIG. 11 are graphs which illustrate typical realizations of time series, $AR_A(2)$ and $AR_B(2)$, both with $\theta=3$.

The "θ−1" constant-θ contour is plotted in FIG. 10a. It shows the plot in the first quadrant of the z-plane with a semi-circle for comparison. By setting θ=1 in equation (4), we obtain the quartic equation, $(x^2+y^2)^2+x^2+y^2-2x=0$, shown in FIG. 10a. For comparison, the circle shown in FIG. 10a has the quadratic equation, $(x-½)^2+y^2=(½)^2$. If we consider the θ=1 contour approximately circular, in FIG. 10b, we can see that constant-θ contours for θ>1 are approximate circles of smaller diameter and with centers along the real axis closer to the unit circle. Any pole pairs that lie on the same constant-θ contour will have different $\{a_1, a_2\}$ coefficients but the same θ. For example, consider the two AR(2) processes marked on the θ=3 contour in FIG. 10b (only the pole in the first quadrant is marked). The first process, $AR_A(2)$, has poles at $(0.9 \pm j0.26)$ and the second process, $AR_B(2)$, has poles at $(0.35 \pm j0.17)$. The corresponding AR coefficients are $\{-1.8, 0.8776\}$ and $\{-0.7, 0.154\}$, respectively. Typical 100-point data sequences are shown in FIG. 11. As is clear, $AR_A(2)$ and $AR_B(2)$ are very different processes with different correlation functions (or spectral densities), yet the same θ. The significance of this invariance property will become clearer when we consider its practical application in the case of machine-tool chatter signal analysis and related simulation studies.

At this time, it is not clear what invariant physical property of the random process is being captured by the scale of fluctuation. However, it is interesting to consider further the linear time invariant system in the modeling of AR processes. In this simple, 2-order linear system case, we can compare the constant-θ contour to other traditional contours such as constant-ξ (damping ratio) and constant-$\omega_n$ (natural frequency) contours [3]. The constant-ξ contours are logarithmic spirals and the constant-$\omega_n$ contours are at right angles to the logarithmic spirals, both distinctly different from the constant-θ contour. Our conjecture is that all Gaussian random processes that lie on the constant-θ contour have similar unit-standard deviation contour volume. This possibility will be explored further for the case of simulated machine-tool chatter signal analysis.

IV. Time-Varying "θ" of Discrete-Time Signals

In recent years, significant advances have occurred in the field time-varying spectra or "time-frequency distributions" [1]. The time-frequency distributions (TFDs) allow you to estimate the power spectral density as it varies over time, primarily for deterministic signals. These concepts have been extended to random signals by the development of time-varying model based TFD called "TVM-TFD" [6].

Consider a general state space model of a time-varying stochastic discrete-time signal, y(n), as given below:

$$\underline{X}(n+1) = A_n \underline{X}(n) + \underline{w}(n); \ \underline{X}(n) \times [X_1(n) \ldots X_k(n) \ldots X_M(n)]^T \quad (5a)$$

$$y(n) = \underline{\phi}_n^T \underline{X}(n) + e(n); \quad (5b)$$

$$\underline{\phi}_c = \frac{1}{M} \left[ 1 \ldots e^{-j\frac{2\pi}{M} nk} \ldots e^{-j\frac{2\pi}{M} n(M-1)} \right]^T$$

For arbitrary choice of the matrix, $A_n$, and the vector $\phi_n$, equations (5a), (5b) is sometimes referred to as a time-variable parameter (TVP) model of a stochastic time series [13]. In the noise-free observation case, y(n) can be written as:

$$y(n) = \underline{\phi}_n^T \underline{X}(n) = \frac{1}{M} \sum_{k=0}^{M-1} e^{-j\frac{2\pi}{M} nk} X_k(n) \quad (6)$$

Equation (6) can be seen to be the Goertzel algorithm [8] where $X_k(M)$ is the kth coefficient of the M-point DFT of the finite-duration sequence $\{y(n), 0 \leq n \leq (M-1)\}$ and $\underline{X}(n)$ is the vector, elements of which are the M-point DFT coefficients, $X_k(M)$, k=1 to M.

An alternate way to consider equation (6) is by comparison with the Cramer spectral representation when y(n) is restricted to being wide-sense stationary [10]. The Cramer representation of y(n) can be written as:

$$y(n) = \frac{1}{2\pi} \int_{-\pi}^{\pi} e^{j\omega n} dZ.$$

The increment process $\{dz(\omega)\}$ has the properties that its energy at different frequencies is uncorrelated and that the expected value of $|dZ(\omega)|^2$ defines the spectrum $S_y(\omega)d\omega$. Analogous to $|dZ(\omega)|^2$, for the nonstationary case in equation (2), we can define a time-varying spectrum based on $\underline{X}(n)$. We proceed as follows.

In equation (5), assume that e(n) and $\underline{w}(n)$ are zero-mean Gaussian white noise sequences such that $E[e(k)\underline{w}(1)] = \underline{0}$ for all k and 1 and the initial "state" $\underline{X}(0)$ is independent of e(k) and $\underline{w}(1)$. In the case where N samples of y(n) are available, $\underline{X}(n)$ can be estimated by Kalman filtering algorithm [5,13]. Specifically, given a noisy observation, y(n), the Kalman filter computes estimates $\underline{X}(n)$ of the DFT coefficients at time n. The variations of the DFT coefficients over time can be used to estimate the time-frequency distribution [1, 12]. We define the time-varying model based time-frequency distribution (TVM-TFD) as:

$$S(k,n) = |X_k(n)|^2 \text{ for } n,k=1,2, \ldots N \quad (7)$$

The TVM-TFD, S(k,n), estimates the power spectral density at discrete frequency, k and discrete time, n. By extending equation (1) by the use of time-varying normalized spectral density function, g(ωt), a time-varying θ can be defined as being proportional to the zero-frequency ordinate of the normalized time-varying spectral density function, i.e., $\theta(t) = \pi g(0,t)$. For the discrete-tie case, based on the TVM-TFD, we define an estimate of the time-varying scale of fluctuation, T(n), as follows:

$$T(n) = \frac{S(0,n)}{r(0,n)} \quad (8)$$

Here, r(m,n) is the instantaneous autocorrelation sequence and r(0,n) is the instantaneous mean-squared value of the discrete-time random process, y(n).

V. Time-Varying "θ"—Simulation Studies

The properties of the estimate of the time-varying scale of fluctuation, T(n), will closely resemble the properties of the TVM-TFD [6]. The use of Kalman filtering for TVM-TFD assures optimality of estimates in the mean-square sense which translates into good noise performance. The good localization and cross-term properties of the TVM-TFD results in S(0,n) being a good time-varying estimate of the zero-frequency ordinate of the time-varying spectral density function. In this section, we demonstrate some of these properties through simulation studies. The simulation data are chosen with the additional aim of providing a basis for the explanation of real data tests to be undertaken in Section VI.

Figure 12:
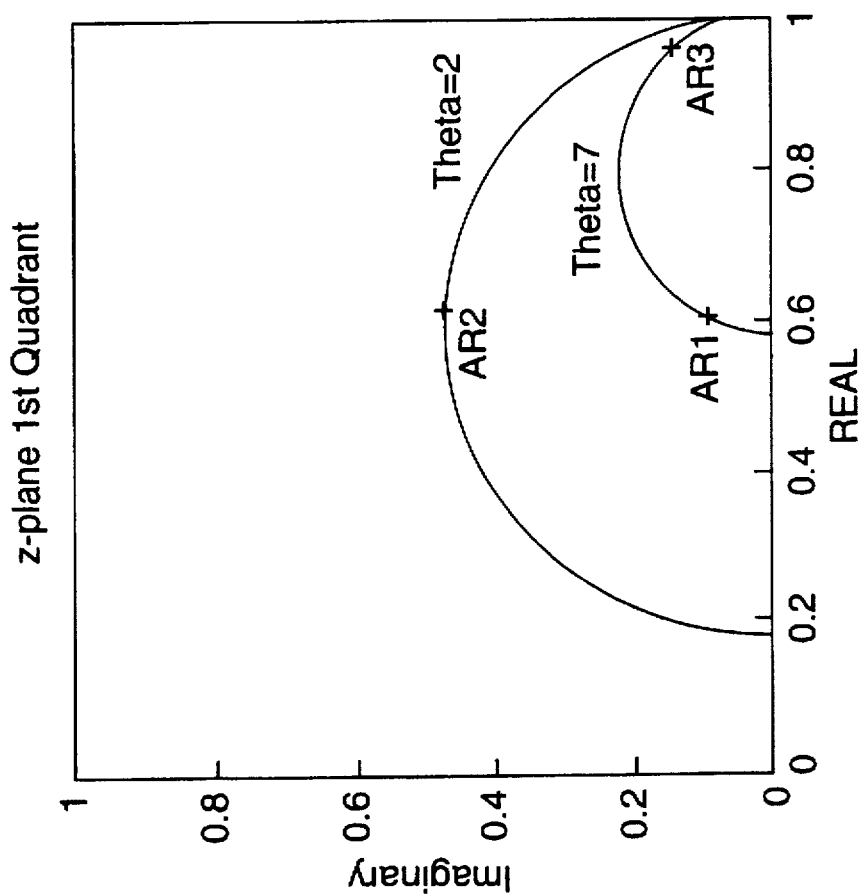
FIG. 12 is a graph with constant $\theta$ contours; $AR_1$ and $AR_3$ on $\theta=7$ contour and $AR_2$ on $\theta=2$ contour.
Figures 13A, 13B, 13C:
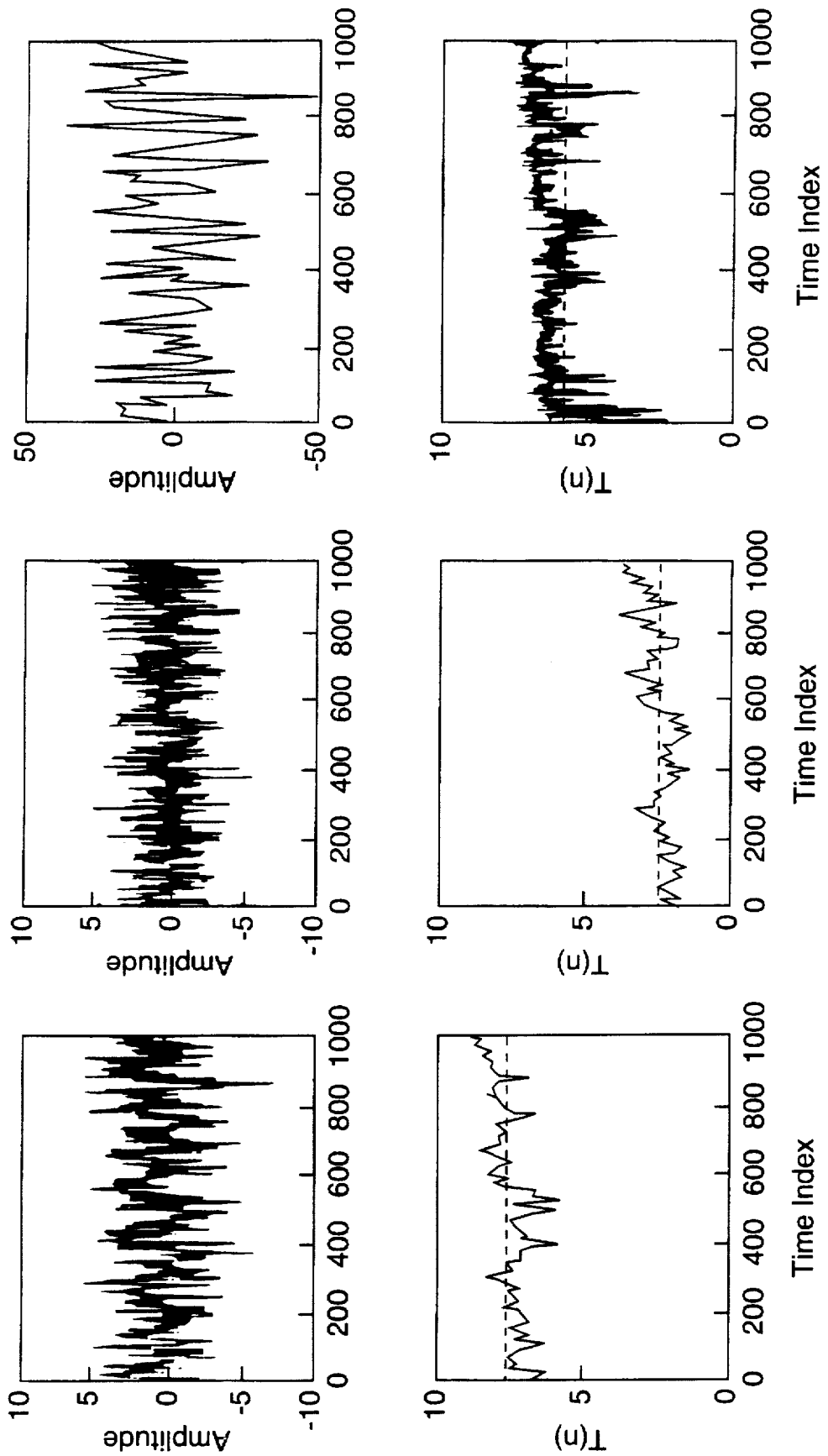
FIGS. 13a, 13b and 13c are graphs which illustrate the results of simulation studies involving 3 AR(2) process, respectively, $AR_1$ with $\theta_1=7$, $AR_2$ with $\theta_2=2$, and $AR_3$ with $\theta_3=7$; typical realizations are shown in the top row and time-varying scale of fluctuation estimates in the bottom row; mean values of T(n), shown as dotted horizontal lines, are 7.2, 2.2 and 6.6 for $AR_1$, $AR_2$ and $AR_3$, respectively.

The pole positions of the three AR(2) processes are shown in FIG. 12. The processes are (1) $AR_1$, with poles at $(0.6\pm j0.095)$ and corresponding AR coefficients $\{-1.2, 0.369\}$, (2) $AR_2$, with poles at $(0.6\pm j0.46)$ and corresponding AR coefficients $\{-1.2, 0.5716\}$ and (3) $AR_3$, with poles at $(0.95\pm j0.15)$ and corresponding AR coefficients $\{-1.9, 0.9221\}$. The θ of the three processes are calculated by equation (2) and marked on the constant-θ contours in FIG. 12. The θ for $AR_1$, $\theta_1$ and $AR_3$, $\theta_3$ are equal ($\theta_1=\theta_3=7$) whereas for $AR_2$, $\theta_2=2$. The FIGS. 13a, 13b and 13c show a realization of 1000 points each of the three time series as well as plots of the estimates of the time-varying scale of fluctuation, T(n), for each time series. By visual inspection of the time series plots, it can be seen that the time-domain (amplitudes) and frequency-domain (broad-band nature) features of $A_1$ and $AR_2$ are very similar and $AR_3$ is most dissimilar whereas T(n) of $AR_1$ and $AR_3$ are similar (estimate close to the theoretical value of 7) and $AR_2$ is most dissimilar (estimate close to the theoretical value of 2). It can be observed that T(n) "tracks" the theoretical θ value for the three processes quite closely. The mean values of T(n) (shown by dotted horizontal line) in FIGS. 13a, 13b and 13c are 7.2, 2.2 and 6.6, showing good agreement with the theoretical θ values.

Comparing FIGS. 13a and 13c, it is striking to note that whereas their θ values are equal (=7), the appearance of the time series is quite different. The $AR_3$ series is over 5 times in amplitude compared to $AR_1$. The $AR_3$ series is also quite band-limited compared to the broad-band nature of $AR_1$. Note that these features are entirely consistent with the pole positions shown in FIG. 12 for these two processes. Conversely, from FIGS. 13a and 13b, it is striking to note that whereas their θ values are different (7 and 2, respectively), the appearance of the time series is quite similar. This leads to the conclusion that θ captures some property of the random process different from its first or second order statistical properties. In other words, even though the definition of θ is based on the autocorrelation or spectral density function, θ may capture one (or some small set of) specific feature of the joint probability density function. The intuition related to the real-data application to be discussed in Section VI leads to the possibility that the specific feature θ captures may be related to the volume of the unit standard deviation contour of the joint probability density function. We explore this possibility as follows.

Consider an n-dimensional random vector, y, representing a Gaussian discrete-time random process. The joint probability density function of y is given by the following equation:

$$f(y) = \frac{1}{2\pi|C|^{1/2}} \exp\left[-\frac{1}{2}(y-\mu)^T C^{-1}(y-\mu)\right]$$

Here, μ is the mean vector and C is the autocovariance matrix. For the zero-mean case, the unit standard deviation (u.s.d.) contour is given by the equation, $y^T C^{-1} y+1$ [see 2, for example]. In the 2-dimensional case, the equation is that of an ellipse with the semi major and minor axes equal to τ times the product of the square roots of eigenvalues of C, the autocovariance matrix [2]. Generalizing the n-dimensional case, the volume, V, of the unit standard deviation contour (a hyper-ellipse) is given by the following expression, where $\lambda_i$ is an eigenvalue of C.

$$V = \pi \sqrt{\lambda_1 \lambda_2 \ldots \lambda_n}$$

Figure 14A:
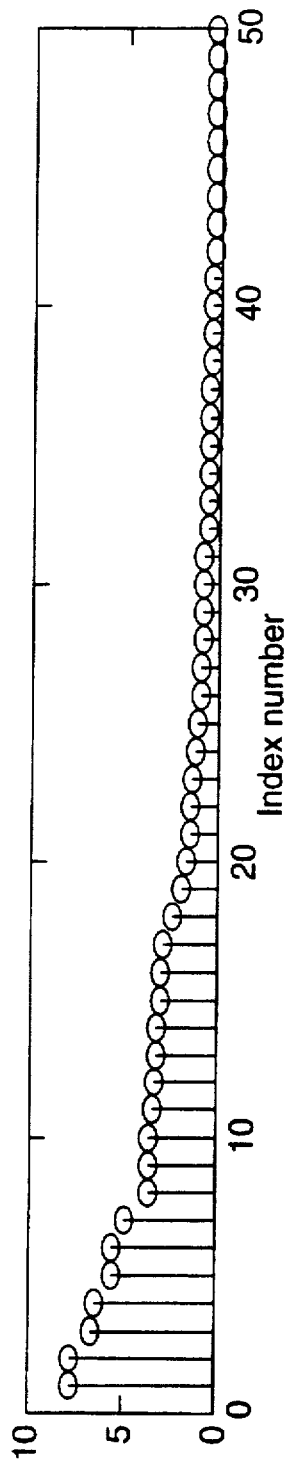
FIGS. 14a, 14b and 14c are graphs which illustrate eigenvalues of the averaged normalized autocovariance matrices of $AR_1$, $AR_2$ and $AR_3$, respectively.
Figure 14B:
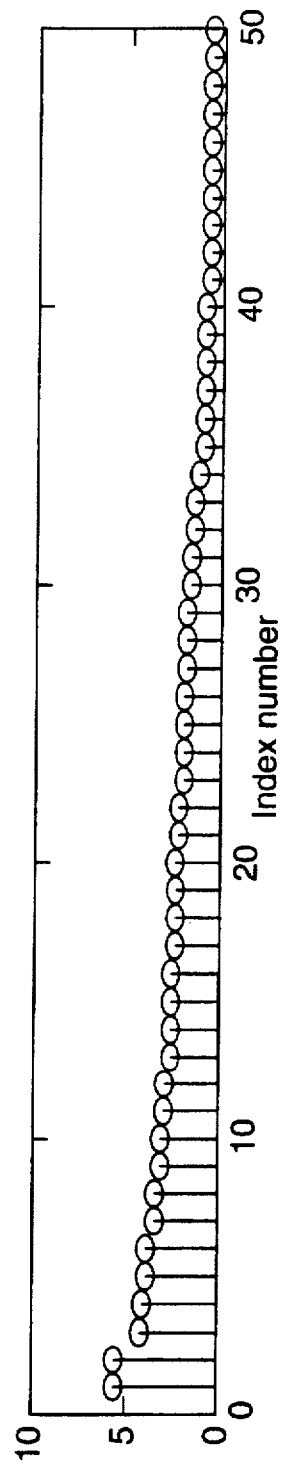
Figure 14C:
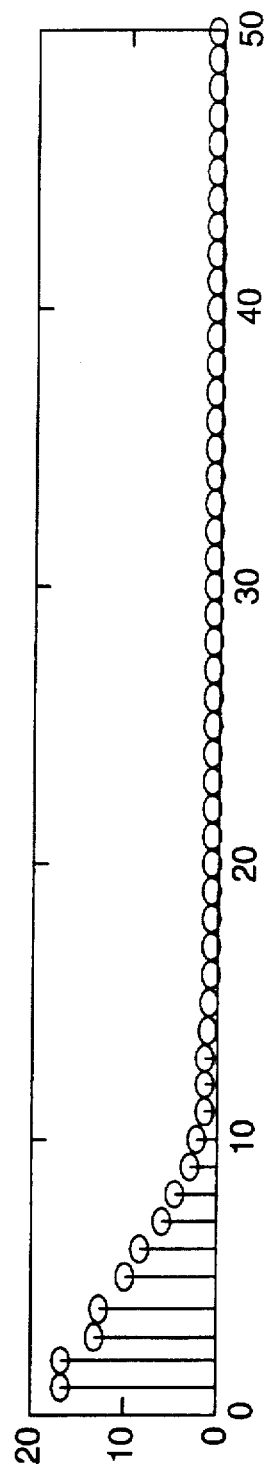

In our simulation studies, the u.s.d. contour volumes were estimated for the three random processes from each of their (100×100) averaged, normalized autocovariance matrices. In FIGS. 14(a), 14(b) and 14(c), the largest 50 eigenvalues in descending order are plotted for $AR_1$, $AR_2$ and $AR_3$. It can be seen that the number of significant eigenvalues are different for each process. The selection of the number of significant eigenvalues is generally problematic. To aid in the selection process, we proceeded as follows. For $AR_1$ and $AR_3$ in FIGS. 14a and 14c, we calculated the "change of slope" of the ordered eigenvalues to aid in the detection of the "knee" in the eigenvalue profiles. The largest index for which the change of slope was grater than 1 was judged to be the location of the knee. The number of significant eigenvalues (index number, K) was chosen as one index number less than the knee location. Such a procedure yielded values of 7 and 6 for $AR_1$ and $AR_3$. For $AR_2$ in FIG. 14b, a "knee" is not detectable; K was chosen as 25 at which a sudden change of the magnitude of the eigenvalue can be detected. The u.s.d. contour volume of each joint probability density function is calculated by equation (10) where n is replaced by K for that random process.

TABLE 1

Comparison of Unit Standard Deviation Volume

| AR Process | 0 | Number of Significant Eigenvalues, K | Unit Standard Deviation Contour Volume |
|---|---|---|---|
| $AR_1$ | 7 | 7 | $2.0 \times 10^3$ |
| $AR_2$ | 2 | 25 | $2.03 \times 10^6$ |
| $AR_3$ | 7 | 6 | $6.4 \times 10^3$ |

The comparison in Table 1 shows that $AR_1$ and $AR_3$ have similar 0, "degrees of freedom" and volumes whereas $AR_2$ has a volume 3 orders of magnitude larger. This observation justifies the conjecture that 0 may capture a measure related to the volume of the unit standard deviation contour. The fact that small 0 implies large volume in which the random process exists suggest an intuitively appealing explanation of the results of the real-data application to be discussed in the next section.

VI. An Application Of Time-Varying "θ": Prediction Of Machine Tool Chatter

Machine tool chatter is a self-excited relative vibration between the workpiece and the cutting tool in common machining processes such as turning process on a lathe [7]. The presence and evolution of chatter can be monitored by measuring the vibration signals from the cutting tool using appropriately placed accelerometers. Such a signal is called the "chatter signal." The chatter signal can be analyzed to discern the state of the machining process and this information can be used to predict the possible future development of chatter.

In FIGS. 7 and 8, the chatter signal and the corresponding estimates of the time-varying scale of fluctuation, T(n), are shown. In FIG. 7, the condition of the machine is "normal operation." It can be noticed that the time series and T(n) are comparable to $AR_1$ in the simulation studies in Section V (compare FIGS. 7 and 13a). In FIG. 8, the first 300 milliseconds or so is the "pre-chatter" period and the rest is the "fully-developed chatter" period. The "pre-chatter" period is comparable to FIG. 13b and "fully-developed chatter," to FIG. 13c.

The following features are important to note in FIGS. 7 and 8. The amplitude scales for chatter signal are different; the amplitude in FIG. 7 during normal operation is of the same order as the amplitude of pre-chatter signal in the interval from 0 to 250 msec in FIG. 8. In FIG. 7, the value of T(n) stays relatively stable around 7. In FIG. 8, when chatter is fully developed after 450 msec, T(n) value is again approximately around 7. Thus T(n) is relatively insensitive to operating conditions during normal operation and fully developed chatter. In FIG. 7, the value of T(n) is significantly and consistently below 5 during pre-chatter condition. It can be concluded that the value of T(n) staying below 5 is a predictor of chatter that develops fully after approximately 400 msec.

The reduction of the value of T(n) during pre-chatter period as a predictor of future chatter development can be explained in the light of observations made in Section V. The random process during pre-chatter condition behaves similar to $AR_2$ in Section V, which as shown in Table 1, goes through an increase in "degrees-of-freedom" or its u.s.d. contour volume. This expansion of the machine system's phase-space makes it vulnerable to be trapped into certain fundamental modes of the system which will result in energy build up in a narrow frequency range and resultant nonlinear limit cycle type of oscillations characteristic of chatter.

VII. Conclusions

The invariance property of scale fluctuation, θ, for certain class of random processes was introduced. For second-order auto-regressive random processes, it was shown that constant-θ contours are approximately circles with centers on the non-negative real axis with radius less than or equal to half. It should be noted that the invariance property of θ discussed in this article is distinct from a quantity Vanmarcke has defined as "invariant-θ" of a random process which is the product of the variance and the θ of the random process [11]. It can also be seen that in the second order system case, the contours of constant "invariant-θ" is quite different from the approximately circular constant θ contours discussed in this article.

A Kalman filter based non-parametric method of estimating time-varying θ was developed using the time-varying model-based time-frequency distribution. Simulated data showed that θ captures a very important invariant property related to the unit-standard deviation contour volume of the joint probability density function of the Gaussian random process. Tests with real vibration data from machine tools before and during chatter show that estimated θ may permit on-line prediction of chatter development many hundreds of milliseconds in advance.

References

[1] Cohen, L. *Time Frequency Analysis*, Prentice-Hall, New Jersey, 1995.

[2] Duda R. O. and Hart, P. E., *Pattern Classification and Scene Analysis*, John Wiley, N.Y., 1973.

[3] Franklin, G. F. and Powell, J. D., *Digital Control of Dynamic Systems*, Addison-Wesley, Mass., 1981.

[4] Haykin, S., *Adaptive Filter Theory*, 3rd edition, Prentice-Hall, New Jersey, 1996.

[5] Kalman, R. E., "A New Approach to Linear Filtering and Prediction Problems", *ASME Trans., J. Basic Eng.*, vol. 83-D, pp. 95–108, 1960.

[6] Madhavan, P. G. and Williams, W. J., "A Time Varying Model for the Estimation of Time-Frequency Distribution of Signals in the Presence Of Noise", *IEEE Signal Processing Letters*, 1996 (submitted).

[7] Minis, I. E., Magrab, E. B. and Pandelidis, I. O., "Improved Methods for the Prediction of Chatter in Turning, Part 3: A Generalized Linear Theory", ASME *Journal of Engineering for Industry*, vol. 112, pp. 28–35, 1990.

[8] Oppenheim, A. V. and Schafer, R. W., *Discrete-Time Signal Processing*, Prentice Hall, New Jersey, 1989.

[9] Rodriguez-Iturbe, I., "Scale of Fluctuation of Rainfall Models", *Water Resources Research*, vol. 22, pp. 15S–37S, 1986.

[10] Thomson, D. J., "Spectral Estimation and Harmonic Analysis", *Proc. IEEE*, vol. 70, pp. 1055–1096, 1982.

[11] Vanmarcke, E. *Random Fields: Analysis and Synthesis*, MIT Press, Massachusetts, 1988.

[12] Williams, W. J. and Jeong, J., "New Time-Frequency Distributions for the Analysis of Multicomponent Signals", *Proc. SPIE*, vol. 1155, pp. 483–495, 1989.

[13] Young, P., "Time Variable and State Dependent Modeling of Non-Stationary and Nonlinear Time Series", in *Developments in Time Series Analysis*, Subba Rao, T. (ed), Chapman & Hall, London, 1993.

While the best mode for carrying out the invention has been described in detail, those familiar with the art to which this invention relates will recognize various alternative designs and embodiments for practicing the invention as defined by the following claims.

What is claimed is:

1. A method for predicting limit cycle oscillations in a natural system, the method comprising the steps of:

measuring oscillatory behavior in the natural system to obtain a first signal based on the oscillatory behavior;

statistically processing the first signal to obtain a corresponding envelope signal;

monitoring instantaneous changes in a function which is based on the envelope signal; and generating a classifier signal when the instantaneous changes are less than a predetermined threshold value for a predetermined time period whereby the classifier signal is a prediction of the limit cycle oscillations.

2. The method as claimed in claim 1 wherein the limit cycle oscillations are undesirable vibrations.

3. The method of claim 2 wherein the undesirable vibrations are machine tool chatter.

4. The method of claim 1 wherein the step of monitoring includes the step of estimating an instantaneous scale of fluctuation of the envelope signal and wherein the instantaneous changes are based on the instantaneous time-frequency distribution.

5. The method of claim 4 wherein the instantaneous time-frequency distribution is a Kalman time-frequency distribution.

6. The method of claim 1 wherein the first signal is a vibration signal.

7. The method of claim 1 wherein the first signal is a sampled vibration signal.

8. The method of claim 1 wherein the function is an instantaneous scale of fluctuation.

9. The method of claim 1 wherein the function is an autocorrelation function.

10. A method for controlling limit cycle oscillations of an object, the method comprising the steps of:

generating an electrical signal based on oscillatory behavior of the object;

statistically processing the electrical signal to obtain a corresponding envelope signal;

monitoring instantaneous changes in a function which is based on the envelope signal;

generating a classifier signal when the instantaneous changes are less than a predetermined threshold value for a predetermined time period whereby the classifier signal is a prediction of the limit cycle oscillations; and controlling the limit cycle oscillations of the object based on the classifier signal.

11. The method as claimed in claim 10 wherein the step of controlling includes the step of generating an output control signal adapted to control a machine tool.

12. The method of claim 11 wherein the output control signal is a speed control signal.

13. The method of claim 12 wherein the object is a machine tool having a spindle and wherein the speed control signal is a spindle speed control signal.

14. A system for predicting limit cycle oscillations, the system comprising:

a detector for generating a first signal based on oscillatory behavior;

a signal processor for statistically processing the signal to obtain a corresponding envelope signal;

a monitor for monitoring instantaneous changes in a function which is based on the envelope signal; and a signal generator for generating a classifier signal when the instantaneous changes are less than a predetermined threshold value for a predetermined time period whereby the classifier signal is a prediction of the limit cycle oscillations.

15. The system of claim 14 wherein the limit cycle oscillations are undesirable vibrations.

16. The system of claim 15 wherein the undesirable vibrations are machine tool chatter.

17. The system of claim 14 wherein the monitor includes an estimator for estimating instantaneous scale of fluctuation of the envelope signal and wherein the instantaneous changes are based on the instantaneous time-frequency distribution.

18. The system of claim 17 wherein the instantaneous time-frequency distribution is a Kalman time-frequency distribution.

19. The system of claim 14 wherein the first signal is a vibration signal.

20. The system of claim 14 wherein the first signal is a sampled vibration signal.

21. The system of claim 14 wherein the function is an instantaneous scale of fluctuation.

22. The system as claimed in claim 14 wherein the function is an autocorrelation function.

23. A system for controlling limit cycle oscillations of an object, the system comprising:

a detector for generating an electrical signal based on oscillatory behavior of the object;

a signal processor for statistically processing the electrical signal to obtain a corresponding envelope signal;

a monitor for monitoring instantaneous changes in a function which is based on the envelope signal;

a first signal generator means for generating a classifier signal when the instantaneous changes are less than a predetermined threshold value for a predetermined time period whereby the classifier signal is a prediction of the limit cycle oscillations; and a second signal generator for generating an output control signal based on the classifier signal.

24. The system as claimed in claim 23 wherein the output control signal is adapted to control a machine tool.

25. The system as claimed in claim 24 wherein the output control signal is a speed control signal.

26. The system as claimed in claim 25 wherein the object is a machine tool having a spindle and wherein the speed control signal is a spindle speed control signal.

* * * * *